UNITED STATES PATENT OFFICE 2,216,958

MANUFACTURE OF ARTIFICIAL RUBBER BY THE POLYMERIZATION OF BUTADIENES

Wilhelm Pannwitz and Bernhard Ritzenthaler, Ludwigshafen-on-the-Rhine, Germany, assignors, by mesne assignments, to Jasco, Incorporated, a corporation of Louisiana No Drawing. Application March 3, 1938, Serial No. 193,770. In Germany March 4, 1937

9 Claims. (Cl. 260—32)

The present invention relates to a process of making artificial rubber.

It has already been proposed to produce artificial rubber by polymerizing butadiene, its homologues or halogen substitution products, either alone or in admixture with each other or with other compounds polymerizable under the same conditions, in equeous emulsion with or without the addition of agents capable of accelerating the polymerization. As emulsifiers used in the hitherto known process may be mentioned, for example, the salts of fatty acids or sulphonated fatty acids, either alone or in admixture with other known emulifiers, such as alkylated naphthalene sulphonic acids. The said emulsifiers have to be used, however, in comparatively large amounts, as the polymerization would otherwise be but badly initiated and take a relatively slow course. Thus, when using but slight amounts of the said emulsifiers, say from 3 to 5 per cent calculated with regard to the whole emulsion, the polymerization of butadiene alone does not begin even after 2 to 3 days at ordinary or slightly elevated temperature and in the presence of peroxides as catalysts, and the polymerization of a mixture of butadiene and other polymerizable compounds lasts, under the said conditions, from about 4 to 6 days.

We have now found that the polymerization of butadienes, i. e. butadiene itself, its homologues or halogen substitution products, either alone or in admixture with each other or with other compounds polymerizable under the same conditions can be carried out in an aqueous emulsion especially simply and advantageously on an industrial scale when using as emulsifying agents salts of compounds of the general formula X—CH$_2$—CH$_2$—Y—CH$_2$—CH$_2$—NZ, wherein Y means oxygen or sulphur, NZ means the radicle of a secondary amine or a quarternary ammonium compound, X means the radicle of a secondary amine, an acid amide, an ester, an ether, a quaternary ammonium compound or a hydroxyl group at least one of the radicles X and Z containing at least 8 carbon atoms being directly attached to each other in an open chain linkage.

The polymerization, when carried out with the aid of the said emulsifying agents, takes about one third or one quarter only of the time required when using any of the known emulsifiers. Also when using the above identified emulsifiers in relatively small amounts, the time needed for initiating the polymerization is not retarded. Besides a considerable saving of time, the process also presents the advantage of yielding products of superior mechanical properties. As a matter of experience there may be said that the longer the polymerization, the lower the quality of the resulting polymerization products.

In addition, the use of the said emulsifying agents also allows of the co-employment of such polymerizable substances as are comparatively easily saponified in the alkaline medium, necessary when using the salts of higher fatty acids as emulsifiers or as cannot be polymerized at all in a strongly alkaline medium, such as vinyl esters.

The emulsifying agents according to the above formula can be made with advantage by the method described in U. S. application Ser. No. 135,726, filed April 8, 1937, by Wilhelm Pannivitz one of the present inventors and Hans Krzikalla, Conrad Schoeller and Heinrich Denner. The said method comprises heating a compound of the general formula

halogen—CH$_2$—CH$_2$—O—CH$_2$—CH$_2$—X (in which X is halogen or —O—COR— or —OR, R being hydrogen, alkyl, cycloalkyl, aralkyl, aryl or the corresponding substituted radicles) with at least one organic nitrogenous base, the reaction components being so selected that the final product contains at least one radicle selected from the radicles containing at least 6 carbon atoms directly attached to one another and polyalkylene polyamine chains containing at least 6 carbon atoms. Thus compounds of the above type in which X is an amino group can be obtained by reacting 2 molecular proportions of high-molecular weight alkyl amines, which may be prepared for example from animal or vegetable saturated or unsaturated fats or oils, such as train oil or palm kernel oil, or from oxidation products of high-molecular hydrocarbons of the paraffin series or from montanic acids, with 1 molecular proportion of β.β'-dichlordiethylether. Compounds in which X is OH may be obtained by reacting 1 molecular proportion of the said amines with 1 molecular proportion of β-chlor-β'-hydroxy diethylether. Quaternary ammonium compounds may be obtained by reacting 1 molecular proportion of a high-molecular weight aliphatic amine and 1 molecular proportion of a tertiary nitrogen base, such as pyridine, triethylamine, triethanolamine with 1 molecular proportion of dichlordiethylether. Compounds in which X is an ether group may be obtained by reacting amines with compounds of the formula

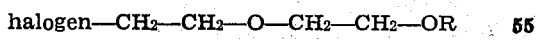
halogen—CH$_2$—CH$_2$—O—CH$_2$—CH$_2$—OR which are obtainable by the reaction of β.β'-dichlordiethyl ether with equimolecular proportions of alkali compounds of phenols, as for example sodium phenolate, or alcoholates of aliphatic, cycloaliphatic or aliphatic-aromatic alcohols, as for example alcoholates of methyl, ethyl, butyl, amyl, cetyl, benzyl or phenylethyl alcohols, cyclohexanol, abietinol or its hydrogenation products containing hydroxyl. Compounds in which X is an ester group may be obtained by reacting amines with compounds of the formula

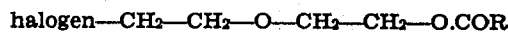

for example the esterification products of beta-chlor-beta'-hydroxydiethyl ether with saturated or unsaturated aliphatic, cycloaliphatic, aliphatic-aromatic or aromatic carboxylic acids such as oleic acid, fatty acids derived from the oxidation of paraffin wax, stearic acid, phenyl-acetic acid, benzoic acid, montanic acid, resin acids, such as abietic acid, and their hydrogenation products or colophony and naphthenic acids. Instead of dichlordiethylether, dichlordiethylsulphide may as well be employed, the corresponding sulfurous products then being obtained.

Suitable substances for the interpolymerization with butadienes are for example unsaturated hydrocarbons, such as styrene or isobutylene, unsaturated esters, such as vinyl esters, acrylic acid esters, cyanosorbic acid esters, acrylic acid nitrile and vinyl chloride.

The polymerization products are obtained in the form of a mobile to viscous dispersion which is stable on standing and does not undergo coagulation, or in the form of thick pastes which may be diluted with water. The emulsion may be coagulated by the addition of electrolytes, especially alkalies, or by the addition of water-soluble organic solvents, such as methanol, ethanol or acetone. The solid products obtained may be worked up like rubber; they are distinguished by superior mechanical properties.

The following examples serve to illustrate how the present invention may be carried out in practice, but the invention is not restricted to these Examples. The parts are by weight.

*Example 1*

A mixture of 2 parts of an emulsifying agent prepared by heating for 3 hours at from 150 to 160° C. one molecular proportion of β-β-dichlordiethylether with two molecular proportions of an amine mixture obtainable by converting the unsaturated acids of train oil into the corresponding nitrile mixture and hydrogenating the same (according to Example 14 of said U. S. application Ser. No. 135,726), and 100 parts of butadiene made up with a solution of 0.75 part of potassium persulphate in 100 parts of water until a homogeneous emulsion is formed. The emulsion is further stirred at 30° C. for 3 days. From the homogeneous dispersion obtained, a rubber-like polymerization product is precipitated on the addition of alkali, the said product having good mechanical properties. Instead of butadiene the same amount of isoprene or β-chlorbutadiene can be employed with the same good result.

*Example 2*

A mixture of 2.5 parts of an emulsifying agent prepared by heating at elevated temperatures one molecular proportion of β-chlor-β'-hydroxydiethyl-ether and 1 molecular proportion of an amine mixture obtainable by converting the unsaturated acids of train oil into the corresponding nitrile mixture and hydrogenating the same (according to Example 14 of U. S. application Serial No. 135,726) and 0.5 part of potassium persulphate dissolved in 200 parts of water is emulsified with 75 parts of butadiene and 25 parts of acrylic acid nitrile, the resulting emulsion being stirred at room temperature. The polymerization is completed after 24 hours. The rubber-like polymerization product obtained from the emulsion by precipitation possesses good mechanical strength.

*Example 3*

A mixture of 75 parts of butadiene and 25 parts of styrene is polymerized in an aqueous emulsion in the manner described in Example 2, 2 parts of a reaction product of 1 molecular proportion of β.β'-dichlordiethylether and 2 molecular proportions of an amine prepared from a paraffin oxidation product with from 14 to 17 carbon atoms being added as an emulsifying agent. The polymerization is completed within about 36 hours. The polymerization product obtained by coagulation has good mechanical properties.

*Example 4*

2.5 parts of the reaction product from β.β'-dichlordiethylsulphide and a mixture of amines prepared from train oil and 0.75 part of potassium persulphate dissolved in 200 parts of water are stirred with 75 parts of butadiene and 25 parts of vinylmethyl ketone until a homogeneous emulsion is formed. After 3 days' further stirring at room temperature the polymerization is complete. The interpolymerization product obtained is easily workable; it has a superior mechanical strength.

*Example 5*

A mixture of 2.5 parts of the emulsifying agent obtained by reacting β-chlor-β'-hydroxydiethyl-ether with octodecenyl amine to form β-octodecenylamino-β'-hydroxydiethyl ether, esterifying the hydroxyl group with chloracetic acid and converting the chloracetic ester thus obtained into the corresponding pyridinium chloride by heating with pyridine, 75 parts of butadiene and 25 parts of alpha-methylvaleric vinyl ester is emulsified in water according to Example 1 and then polymerized. The polymerization is complete after 2 to 3 days. The rubber-like polymerization product obtained in good yield is easily workable and has good mechanical properties.

What we claim is:

1. In the polymerization of butadienes in aqueous emulsions containing emulsifying agents, the step which comprises using as emulsifying agent products of the general formula

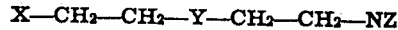

wherein Y is selected from the class consisting of oxygen and sulphur, NZ is selected from the class consisting of the radicle of a secondary amine and a quaternary ammonium compound, X is selected from the class consisting of the radicle of a secondary amine, an acid amide, an ester, an ether, a quaternary ammonium compound and a hydroxyl group, at least one of the radicles X and NZ containing at least 8 carbon atoms directly attached to each other in an open chain linkage.

2. In the process as claimed in claim 1, interpolymerizing butadienes with other organic compounds polymerizable under the same conditions and having at least one double linkage between 2 carbon atoms.

3. In the polymerization of butadiene in aqueous emulsions containing emulsifying agents, the step which comprises using as emulsifying agent products of the general formula

X—CH₂—CH₂—Y—CH₂—CH₂—NZ wherein Y is selected from the class consisting of oxygen and sulphur, NZ is selected from the class consisting of the radicle of a secondary amine and a quatenary ammonium compound, X is selected from the class consisting of the radicle of a secondary amine, an acid amide, an ester, an ether, a quaternary ammonium compound and a hydroxyl group, at least one of the radicles X and NZ containing at least 8 carbon atoms directly attached to each other in an open chain linkage.

4. In the polymerization of a mixture of butadiene and styrene in aqueous emulsions containing emulsifying agents, the step which comprises using as emulsifying agent products of the general formula

X—CH₂—CH₂—Y—CH₂—CH₂—NZ wherein Y is selected from the class consisting of oxygen and sulphur, NZ is selected from the class consisting of the radicle of a secondary amine and a quatenary ammonium compound, X is selected from the class consisting of the radicle of a secondary amine, an acid amide, an ester, an ether, a quaternary ammonium compound and a hydroxyl group, at least one of the radicles X and NZ containing at least 8 carbon atoms directly attached to each other in an open chain linkage.

5. In the polymerization of a mixture of butadiene and acrylic acid nitrile in aqueous emulsions containing emulsifying agents, the step which comprises using as emulsifying agent products of the general formula

X—CH₂—CH₂—Y—CH₂—CH₂—NZ wherein Y is selected from a class consisting of oxygen and sulphur, NZ is selected from the class consisting of the radicle of a secondary amine and a quaternary ammonium compound, X is selected from the class consisting of the radicle of a secondary amine, an acid amide, an ester, an ether, a quaternary ammonium compound and a hydroxyl group, at least one of the radicles X and NZ containing at least 8 carbon atoms directly attached to each other in an open chain linkage.

6. In the polymerization of butadienes in aqueous emulsions containing emulsifying agents, the step which comprises using as an emulsifying agent the reaction product from 1 molecular proportion of β-β'-dichlordiethyl ether with 2 molecular proportions of an amine containing at least 8 carbon atoms directly attached to each other in an open chain linkage.

7. In the polymerization of butadienes in aqueous emulsions containing emulsifying agents, the step which comprises using as an emulsifying agent the reaction product of 1 molecular proportion of β-chlor-β'-hydroxydiethyl ether and 1 molecular proportion of an amine containing at least 8 carbon atoms directly attached to each other in an open chain linkage.

8. In the polymerization of butadienes in aqueous emulsions containing emulsifying agents, the step which comprises using as an emulsifying agent the reaction product of 1 molecular proportion of β-β'-dichlordiethyl ether and 2 molecular proportions of an amine prepared from a paraffin oxydation product containing from 14 to 17 carbon atoms.

9. In the polymerization of a mixture of butadiene and styrene in aqueous emulsions containing emulsifying agents, the step which comprises using as the emulsifying agent the reaction product of 1 molecular proportion of β-β'-dichlordiethyl ether and 2 molecular proportions of an amide prepared from a paraffin oxydation product containing from 14 to 17 carbon atoms.

WILHELM PANNWITZ.
BERNHARD RITZENTHALER.